Patented Oct. 31, 1933

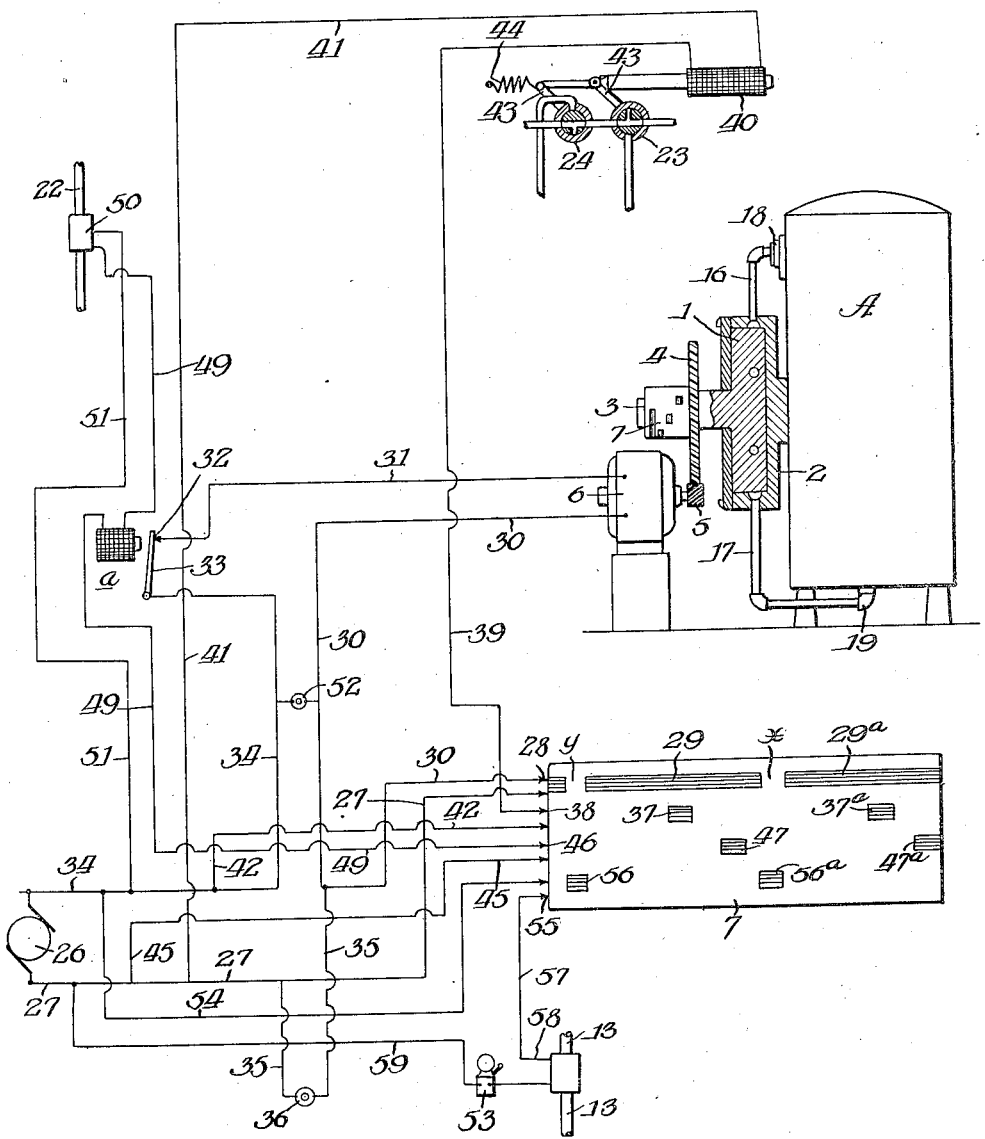

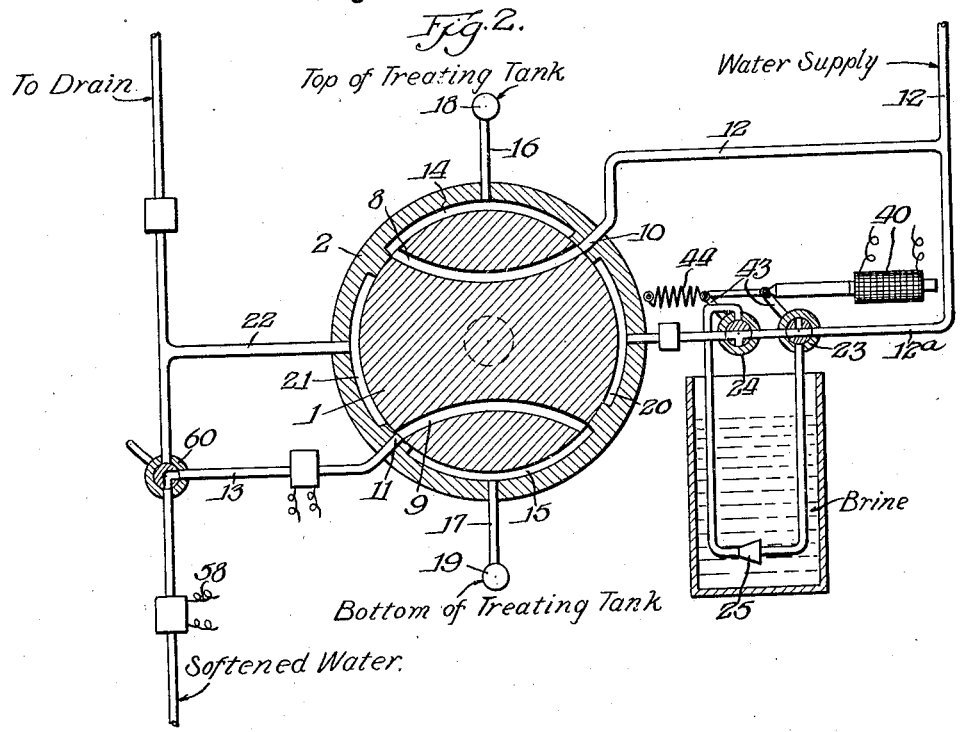
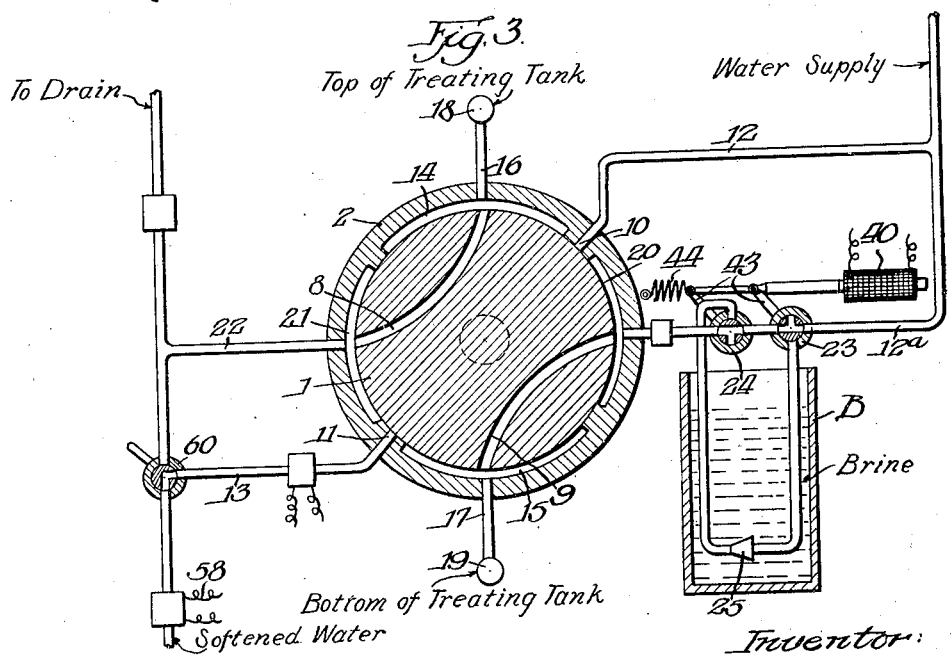

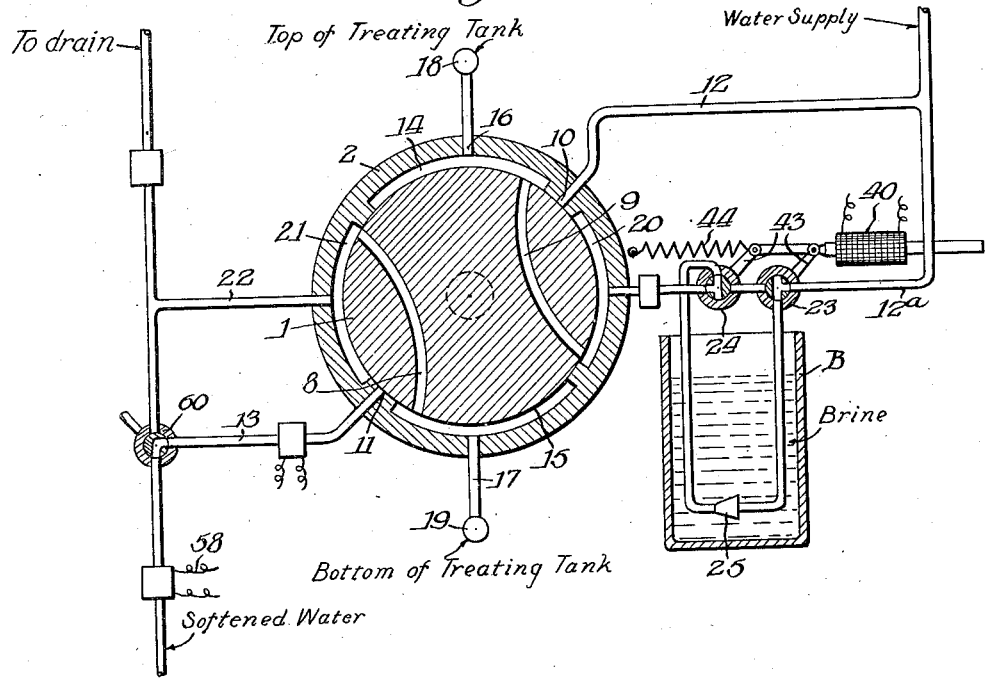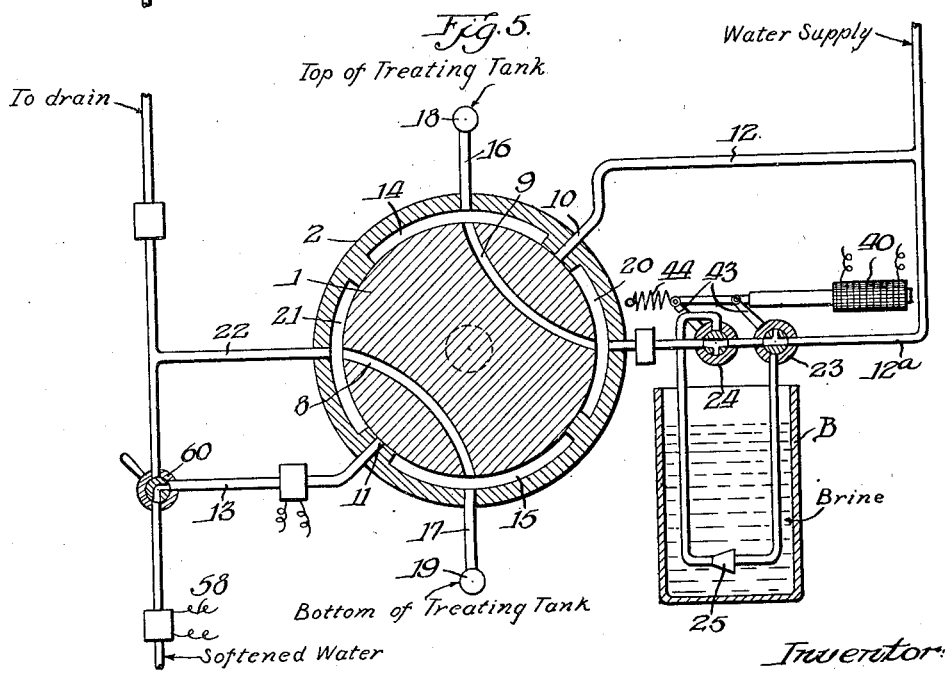

1,933,370

UNITED STATES PATENT OFFICE 1,933,370

WATER SOFTENING APPARATUS

Andrew J. Dotterweich, Pittsburgh, Pa., assignor to Automatic Water Softener Company, Pittsburgh, Pa., a corporation of Delaware Continuation of application Serial No. 697,607, March 7, 1924. This application June 28, 1930. Serial No. 464,509

17 Claims. (Cl. 210—24)

This invention (for which the present application is a continuation of an application filed by me March 7, 1924, Serial No. 697,607) relates to water softening apparatus employing zeolites or water softening material requiring regeneration after exhaustion of the water softening capability of the material. The invention aims to provide an improved apparatus adapted to perform the successive operations involved in reconditioning after exhaustion of the zeolites.

An illustrative apparatus embodying the invention is shown in the annexed drawings, said apparatus also embodying a broader invention described and claimed in my copending application for patent Serial No. 687,340, filed January 19, 1924, and in some respects involving a simplification of and improvements upon the apparatus of said prior application.

It will be understood that the apparatus shown in the drawings represents one illustrative embodiment of the invention, and that the following description with reference to the specific embodiment shown is not to be taken as limiting the invention otherwise than as expressed in the claims following the description.

In the accompanying drawings forming a part of this specification, Fig. 1 is a diagrammatic view showing a tank to contain water softening material, a valve controlling the flow of water and brine through the tank, a motor for operating such valve, and controlling circuits; and Figs. 2, 3, 4 and 5 are views partly in elevation and partly in section illustrating the valve and connections through which the liquids flow in the softening and reconditioning operations, the valve being shown in the different positions to effect softening, backwashing, regeneration and flushing or salt elimination.

Referring to the drawings, a rotating disc shaped valve 1 is shown arranged in a shell 2, the valve being provided with an operating stem 3 projecting through the side wall of the shell. An electric motor 6 drives the stem 7 through a speed reducer diagrammatically illustrated by gears 4 and 5. The required ratio of the speed reducer is determined by the speed of the motor 6 and the desired rate of rotation of the valve 1. On the stem is also secured a drum 7 having contact strips thereon for opening and closing the circuit through motor 6 as hereinafter described.

The shell 2 is interiorly formed with a plurality of U-shaped grooves, the inner walls of said grooves being formed by the peripheral wall of the valve. The peripheral lengths of these passages are dependent on the rate of rotation of the valve and the desired duration of the respective operations involved in reconditioning as hereinafter described.

Adjacent peripheral passages in the shell are connected in suitable sequence for effecting the several operations, by passages 8 and 9 through the valve 1, as shown in Figs. 2 to 5. The shell ports or passages 10 and 11 are connected respectively to the water supply pipe 12 and to the pipe 13 leading to the service line by which the softened water is conducted to the point of use. Shell passages 14 and 15 are connected by pipes 16 and 17 to nozzles 18 and 19 communicating with the tank A containing the water treating material at points above and below the body of such material, and shell passages 20 and 21 are connected respectively to the branch 12ª of water supply pipe 12 and to a pipe 22 leading to a drain.

During the softening period, the valve 1 will be in the position shown in Fig. 2 and water will flow from the source of supply through pipe 12, shell passage 10, valve passage 8, shell passage 14, pipe 16, to nozzle 18 down through the treating material, then out from the softening tank through the lower nozzle 19, pipe 17, shell passage 15, valve passage 9, and shell passage 11 to pipe 13 leading to the point of use. During the softening period which is of considerable duration, the valve 1 is stationary, and hence the areas of shell passages 10 and 11 may be made approximately equal to the areas of the supply pipe and the valve passages, or in other words the passages 10 and 11 may be ordinary ports to register with the valve ports.

When the water softening material in the tank A becomes ineffectual and needs regeneration, the valve is rotated by its motor 6, thereby bringing the valve passage 8 into communication with shell passages 14 and 21, and the valve passage 9 into communication with shell passages 15 and 20, as shown in Fig. 3, and water from the source of supply will then flow through the branch pipe 12ª into shell passage 20 and from shell passage 20 through valve passage 9, shell passage 15, pipe 17, lower tank nozzle 19, up through the material in the tank, and out through the nozzle 18, pipe 16, shell passage 14, valve passage 8, shell passage 21 and pipe 22 to the drain. It will be observed that the direction of flow of water through the tank is the reverse of that during the softening period, and during the backwashing period solid matter deposited in the water softening material or zeolite bed will be removed and carried to the drain, while the zeolite bed will be loosened.

A further rotation of the valve will move the valve passages through the position for regeneration shown in Fig. 4, the valve passage 8 communicating at its ends with the shell passages 15 and 21, and the valve passage 9 with the shell passages 20 and 14. While the valve is being shifted to the position shown in Fig. 4, the three-way valves 23 and 24 are shifted to the position shown in Fig. 4, so that water from the supply pipe branch connection 12$^a$ will flow through the ejector 25 in the brine tank B, and salt water will be drained from the tank B and flow through shell passage 20, valve passage 9, shell passage 14, pipe 16, nozzle 18, down through the material in the tank A for effecting regeneration of the zeolites. The flow from the tank will be through nozzle 19, pipe 17, shell passage 15, valve passage 8, shell passage 21 and pipe 22 to the drain.

Immediately following the regeneration produced by the flow of brine through the water softening material, the material and interior of the tank should be cleaned of all brine or other objectionable liquid by passing fresh water through the tank until the water in the drain line is free of salt. This cleaning operation is otherwise referred to as washing out or flushing. As the fresh water for cleaning or flushing flows through the material in the tank in the same direction as the brine, the peripherally extending shell passages 20, 14, 15 and 21 are made of such lengths that for a given rate of rotation of the valve the valve passages will remain in communication with such shell passages for a sufficient length of time as may be necessary for effecting regeneration and cleaning or flushing, and after a sufficient quantity of brine has flowed through the material in the tank the three-way valves 23 and 24 are shifted to the positions shown in Fig. 5, thereby stopping the flow of brine and permitting water from the source of supply to enter the shell passage 20 and follow the course hereinbefore described to the drain. From the position shown in Fig. 5, the valve will complete its movement by rotating to a position which is a half turn from that shown in Fig. 2, thereby bringing the valve passage 9 to position connecting the shell passages 10 and 14 and the valve passage 8 to position connecting shell passages 15 and 11 so that water from the supply will flow down through the material in the tank and thence to the service line. The foregoing description of the courses followed by the water for backwashing, regeneration and cleaning or flushing, is applicable to the courses followed during the next half revolution of the valve if the reference numeral 9 be substituted for numeral 8 and vice versa.

Referring to the motor and electrical connections, the main operating circuit starting with a generator 26 is formed by conductor 27, one pair of terminals 28, contact strip 29 or 29$^a$ on drum 7, conductor 30, motor 6, conductor 31, contact point 32, armature 33 of an electric magnet $a$, and the conductor 34 to generator. It will be observed that there are two contact strips 29 and 29$^a$ on the controller or drum 7, each having a length little less than half of the peripheral length of the drum, and that there are gaps $x$ and $y$ between adjacent ends whereby the current to the motor is interrupted after the drum and the valve have made half a revolution, and the valve 1 is in a position permitting water to flow through the softening tank to the point of use. In the diagrammatic view Fig. 1 a development of the surface of the controller or drum 7 is shown for convenience in connection with the electric circuits. In order to start the motor when it becomes necessary to regenerate the material, an auxiliary circuit 35, forming a by-pass around the terminals 28 is provided, said by-pass circuit being normally open but adapted to be closed by a switch 36 to complete a circuit through the motor. This circuit is held closed by the switch until by the movement of the drum 7 the terminals 28 contact with a contact strip 29 or 29$^a$ on the drum. During the movement of the drum through this zone, the valve 1 will be shifted as hereinbefore described to permit of the backwashing of the material and also to permit of the flow of water from the supply being again reversed, and to flow down through the materials to the drain. Simultaneously with the movement of the valve from backwashing position, a contact strip 37 or 37$^a$ will contact with the pair of terminals 38, thereby completing a circuit consisting of one of the terminals 38 of conductor 39, the coils of a solenoid 40, conductors 41 and 27, generator 26, conductors 34 and 42 to the other terminal 38. The armature of the solenoid 40 is so connected by levers 43 or other suitable means to the valves 23 and 24 that on the closure of the solenoid circuit the valves will be shifted to direct water from the supply through the ejector 25 in the brine tank B.

The contact strips 37 and 37$^a$ are made of such length that for a given rate of rotation of the rotor comprising drum 7 and valve 1, the valves 23 and 24 will be held in the position shown in Fig. 4 sufficiently long to ensure delivery of the quantity of brine to the softening tank A to effect the regeneration of the material in the tank. As soon as the strip 37 or 37$^a$ passes out of contact with terminal 38, breaking the circuit through the solenoid, the valves 23 and 24 will be returned to normal position by the spring 44, thereby stopping flow of brine to the softening tank and permitting flow of water from the supply connection 12$^a$ into the softening tank to effect the removal of brine and the compound formed with the brine in the tank. In order to ensure the thorough cleaning of the material in the tank A, provision is made for stopping the operation of the motor and the movement of the valve 1 while the latter is in a position to permit of flow of water through the regenerated material to the drain, as shown in Fig. 5, until a thorough cleansing has been effected. To this end a safety circuit is employed, said circuit consisting of (starting from the generator) the conductors 27 and 45, a pair of terminals 46, a contact strip 47 or 47$^a$ on drum 7, conductor 49, coil of electro-magnet $a$, conductor 49, terminals 50, conductors 51 and 34, to generator. The terminals 50 are spaced a short distance apart and their ends project into the drain pipe 22. The strips 47 and 47$^a$ are so located on the drum as to contact with the terminals 46 before the valve 1 has been turned far enough to move the end of passage 9 out of communication with the shell passage 20. If when a contact strip 47 or 47$^a$ contacts with the terminals 46, the water flowing through the drain pipe 22 is conductive, the contacting of the strip 47 or 47$^a$ with terminals 46 will complete the circuit through the electro-magnet $a$ and its armature 33 will be drawn away from terminal 32, thereby breaking the circuit through the motor, thus checking the rotation of the valve 1. The motor and valve will remain stationary until the flow of water through the softening tank to the drain effects the desired cleansing of the material. As soon as the water flowing through the drain is so reduced in conductivity that a current will not flow between the terminals 50, the circuit through the electro-magnet $a$ will be broken, thus permitting the armature 33 to be shifted by its spring into contact with terminal 32, thereby closing the motor circuit, and the operation of the motor will move the valve 1 to the position shown in Fig. 2. As the valve reaches this position, the contact strip 29 or 29ᵃ will pass from under the terminals 28, thus breaking the motor circuit and the valve 1 will remain stationary until regeneration is again necessary, when the described operations will be repeated.

As the starting switch 36 may be located at a distance from the tank A, it is desirable that means be employed so that the operator may be certain that the switch 36 has been closed sufficiently long to ensure the strip 29 or 29ᵃ contacting with terminals 28, and to that end a signal light 52 is located so as to be visible from the switch and is so connected to the motor circuit that current will flow therethrough only when the current is flowing through the motor.

As an additional safeguard, as against the flow of water containing brine to the point of use, provision is made to give a signal of such occurrence. To that end a bell 53 or other suitable signalling device is arranged in a circuit consisting of (starting with the generator) the conductors 34 and 54, terminals 55, a contact strip 56 or 56ᵃ on drum 7, conductor 57, terminals 58, signal 53 and conductor 59 and 27 to generator. The strips 56 and 56ᵃ are arranged on the drum in alignment with the gaps $x$ and $y$ between the strips 29 and 29ᵃ, so that the strip 56 or 56ᵃ will contact with terminals 55 when the valve 1 is in position permitting water to flow through the tank A to the point of use. The ends of the spaced terminals project in the soft water pipe 13 preferably at a point adjacent the tank. As soft water has a comparatively low conductivity, this circuit will not be closed by the movement of the strip 56 or 56ᵃ into contact with the terminals 55 if the water passing from the softening tank is free of brine, but if such water in the pipe 13 is rendered conductive by the presence of brine, the circuit will be closed and the signal operated. In order to eliminate the brine, when the valve is in the position shown in Fig. 2, the pipe 13 is provided with a three-way valve 60 which is connected to drain 22. When the presence of brine in the water passing through the pipe 13 to the point of use is indicated, the attendant will shift the valve 60 to permit the fouled water to flow to the drain until the signal ceases to operate, when the valve 60 is again shifted and water allowed to flow to the point of use.

Means substantially as shown and described in the application Serial No. 687,340 hereinbefore referred to, may be employed for the automatic initiation of the cycle of operations for the several steps accompanying regeneration.

From the foregoing it will be seen that the illustrative apparatus embodies a motor-operated rotor controlling a circulation system for normally passing water to be softened through the container of water softening material to the service line and for reconditioning by successively passing brine or regenerating solution and water for washing out or flushing through the container otherwise than to the service line and then resuming normal operation, said rotor incorporating a valve which successively establishes flow connections through the container for the several operations incident to passing from normal operation through the reconditioning cycle and back to normal, and a controller for the motor and associated electrical equipment controlling the regenerating and flushing periods. In this specific apparatus, where the flow in the softening, regenerating and flushing periods is downwardly through the zeolite bed or water softening material contained in the softening tank, a back washing operation immediately preceding regeneration is desired and is accordingly included in the regenerating cycle, by causing the water to flow in a reverse direction through the container to the drain when the valve is moved from normal position; while the specific valve is of a character to maintain its back washing connections during a portion of its movement and to establish and maintain connections for the regenerating and flushing operations during a succeeding portion of its movement.

Briefly summarizing the operation of the illustrative apparatus, when the cycle is initiated by starting the motor, either by closing a manual switch 36 or automatically as for instance after a predetermined time period determined by a time clock or after exhaustion of the zeolites through the use of electrical control means responsive to conductivity of the water discharged from the container, as explained in my aforesaid application Serial No. 687,340, the movement of the rotor brings one of the contact strips 29 or 29ᵃ of the controller into contact with the motor circuit terminals 28, and the motor having its operating circuit established through such contact strip will operate to turn the valve through a half turn from its initial position for the softening operations shown in Fig. 2. In this half rotation, the valve in the preliminary stage of its motion reverses the flow connections with the container of softening material while establishing communication through the container between the water supply branch 12ᵃ and the drain for the back washing operation, as explained with reference to Fig. 3, and then as the movement continues the valve again reverses its flow connections with the container while establishing communication therethrough between said water supply branch 12ᵃ and the drain for the regenerating and flushing operations, as explained with reference to Figs. 4 and 5. As the valve in its movement establishes connections for regeneration, one of the controller contacts 37 or 37ᵃ connects the terminals 38 of the auxiliary circuit for energizing the electro-magnet 40, thereby operating the valves 23 and 24 to cause the water to pass via the brine ejector and carry brine through the softening tank for the regenerating operation, and when said contact 37 or 37ᵃ passes from said circuit terminals 38 the said electro-magnet 40 becoming deenergized allows the valves to be spring returned to their normal position so that water from the supply pipe will pass directly to and through the container for the flushing operation. When during the continued rotation one of the controller contacts 47 or 47ᵃ connects the conductor terminals 46 of the circuit for the make-and-break device represented by electro-magnet $a$ and its armature 33, and which circuit includes terminals or electrodes at 50 in the drain pipe connection, then so long as the drain water runs salty and conductive the magnet a being energized will attract its armature, thereby breaking the motor circuit. Hence the motor and valve will stop until fresh water runs through the drain, whereupon the loss of conductivity between the terminals 50 will result in de-energization of the magnet a, releasing its armature to close the motor circuit and allow the rotation to continue. This continued rotation completing the flushing period will carry the contact strip 29 or 29a out of contact with the motor circuit terminals 28, or in other words open the motor circuit at a gap $x$ or $y$ of the controller drum, the valve being now again in a normal or water softening position. As previously stated, in this normal position one of the contacts 56 or 56a connects terminals 55 of a circuit for operating signal 53 in case of any unanticipated flow of brine to the service line, this being an added precaution.

Obviously the invention is not limited to the particular embodiment shown; moreover it is not indispensable that all the features thereof be conjointly used, since the same may be advantageously employed in various different combinations and subcombinations to meet particular requirements.

What I claim as my invention, and desire to secure by Letters Patent, is:

1. In a water softening apparatus the combination with a zeolite container, a brine tank and conduits for passing water through said container and for delivering brine from said tank into said container, of a multiple port rotary valve controlling the flow in said conduits, a motor operatively connected to said rotary valve for actuating the same, and electrical means for intermittently operating said motor comprising a switch connected to be operative by said motor and a motor control circuit including said switch, said switch and circuit being arranged to stop said motor as the result of the turning of said valve through a predetermined angle.

2. In a water softening apparatus the combination with a zeolite container, a brine tank and conduits for passing water through said container and for delivering brine from said tank into said container, a multiple port rotary valve controlling the flow in the several conduits, a valve operating shaft, a motor operatively connected to said shaft for turning the same, and electrical means for starting and stopping said motor comprising a rotary switch element connected to said shaft, a motor control circuit including said element, a contact arranged in said circuit to coact with said element in opening and closing said circuit, a starting switch and another circuit including said starting switch, adapted to shunt said element and contact.

3. In a water softening apparatus the combination with a zeolite container, a brine tank, and conduits for passing water through said container and for delivering brine from said tank into said container, a multiple port valve controlling the flow in said conduits, a valve operating shaft, a motor operatively connected to said shaft for moving the same, and electrical means for periodically operating said motor comprising a switch operatively connected to said shaft, and a motor control circuit including said switch, said switch and circuit being arranged to stop said motor upon the operation of said motor for a predetermined period.

4. In a water softening apparatus the combination with a zeolite container, a brine tank, and conduits for passing water through said container and for delivering brine from said tank into said container, a multiple port valve controlling the flow in said conduits, a motor operatively connected to said valve for actuating the same, and electrical means for periodically starting and stopping said motor comprising a switch element movable by said motor, a motor control circuit including said element, a contact arranged in said circuit to coact with said element in opening and closing said circuit, a starting switch and another circuit, including said starting switch, adapted to shunt said element and contact.

5. In a water softening apparatus, a container for water softening material, a multiple port rotary valve adapted to establish flow connections between said container and a source of water supply, a source of regenerating material, a drain and a point of use, a motor operatively connected with said valve, electrical means controlling said motor comprising a plurality of switches, one of which is operably connected to said motor, an electrical circuit controlled by said switches, one of said switches controlling the motor circuit to stop the motor in response to movement of the motor, and another of said switches controlling the motor circuit to resume operation of said motor, the last named switch being operable by the water flowing through the container.

6. In a water softening apparatus, a container for water softening material, a multiple port rotary valve adapted to establish flow connections between said container and a source of water supply, a source of regenerating material, a drain and a point of use, a motor operatively connected to said valve, an electrical control circuit for said motor, means operative by the water flowing in the system for energizing said control circuit, and means operative by said motor for deenergizing said circuit.

7. In a water softening apparatus, a container for water softening material, a multiple port rotary valve adapted to establish flow connections between said container and a source of water supply, a source of regenerating material, a drain and a point of use, a motor for operating said valve, control means rendered operative upon energization of said motor to terminate the operation of said motor, and control means operative by the liquid flowing from the container to the drain to again initiate the operation of said motor.

8. In a water softening apparatus, a container for water softening material, a flow system adapted to establish flow connections between said container and a source of water supply, a source of regenerating material, a drain and a point of use, operating mechanism including a multiple port rotary valve in said flow system controlling the flow through said system, for interrupting the flow from the container to the point of use, to establish flow to the drain, and to cause flow from the source of regenerating material through the container to the drain, a motor for said operating mechanism and a single control element rendered operative by the liquid flowing in said system to terminate the operation of said motor and to again initiate the operation of said motor.

9. In a water softening apparatus, a container for water softening material, a flow system adapted to establish flow connections between said container and a source of water supply, a source of regenerating material, a drain and a point of use, a multiple port rotary valve in said flow system controlling the flow through said system, a motor for operating said valve, and a control for said motor, said control being operative by the liquid flowing from the container to the drain to cause the motor to actuate the rotary valve to divert the flow from the drain to the point of use.

10. In a water softening apparatus, a container for water softening material having inlet and outlet passages, a flow system adapted to establish flow connections between said inlet and outlet passages, a source of regenerating material, a drain, a point of use and a source of water supply, a rotary multi-port valve in said flow system controlling the flow in said system, a motor for operating said valve, control means for said motor, means responsive to the liquid flowing in the said system for connecting said motor to a source of energy, said valve being adapted, upon energization of said motor, to divert the flow from the drain to the point of use, and said control means being rendered operative by said motor to terminate the operation of the motor when the flow to the point of use has been established.

11. In a water softening apparatus, a container for water softening material, a flow system adapted to establish flow connections between said container and a soft water service pipe, a regenerating solution pipe, a drain pipe and a hard water supply pipe, a multi-port rotary valve in said system adapted to reverse the direction of flow through said container, a motor and control means therefor to actuate said valve to effect said reversal of flow for a period determined by the continuous operation of the motor.

12. In a water softening apparatus, a container for water softening material, a flow system adapted to establish flow connections between said container and a source of water supply, a source of regenerating material, a drain and a point of use, a multi-port rotary valve in said flow system controlling the flow through said flow system and adapted to interrupt the flow from the container to the point of use, establish flow to the drain, and to control flow from the source of regenerating material through the container to the drain, an actuator for said valve, means for energizing said actuator, and control means rendered operative upon energization of said actuator and independently of the flow in said system to terminate the operation of said actuator.

13. Apparatus for softening water comprising in combination a container for water softening material, a system of piping connecting said container to a source of hard water supply, a source of regenerating material, a drain, and a soft water service line, a multiple port rotary valve disposed in said system to control the flow of water and regenerating material to and from said container, a motor for operating said valve to close the connections for hard water supply to the container, and from the container to the service line, and open the connections from the source of regenerating material to the container, and from the container to the drain, an energizing circuit for said motor, and a switch in said circuit operable by said motor to break said circuit and stop the motor when said rotary valve is set for flow from the hard water supply through the container to the service line.

14. In a water softening apparatus, a container for water softening material, a flow system adapted to establish flow connections between said container and a source of water supply, a source of regenerating material, a drain and a point of use, a rotary multi-port valve in said flow system controlling the flow through said system for interrupting the flow from the container to the point of use, establishing flow to the drain, and to cause flow from the source of regenerating material through the container to the drain, and a motor for operating said rotary valve, said rotary valve comprising a casing and a rotor having ported passages cooperating to maintain flow connections for a definite period during continuous movement of said valve.

15. In a water softening apparatus, a container for water softening material, a flow system adapted to establish flow connections between said container and a soft water service pipe, a regenerating solution pipe, a drain pipe and a hard water supply pipe, a rotary multi-port valve in said system adapted to reverse the direction of flow of hard water in said container, a motor for said valve, said valve comprising a casing and a rotor in said casing, said casing and rotor having ported passages of such length that by continuous operation of the motor the passages cooperate to control the duration of the reversal of flow of hard water in said container, and to establish the flow of regenerating solution to the container.

16. In a water softener, the combination with a tank containing softening material having inlet and outlet passages, of a rotary valve connected to said tank having passages for communication with said tank passages, a flow system connecting said valve with a source of hard water supply, a source of regenerating material, a drain and a point of use, means for establishing flow connections of said rotary valve with the source of regenerating material, means for actuating said rotary valve, and means responsive to the movement of said rotary valve through a predetermined angle for rendering said first named means operative.

17. In a water softening apparatus, a container for water softening material, a flow system adapted to establish flow connections between said container and a source of water supply, a source of regenerating material, a drain and a point of use, a rotary multi-port valve in said flow system controlling the flow through said system for interrupting the flow from the container to the point of use, establishing flow to the drain, and to cause flow from the source of regenerating material through the container to the drain, and a motor for operating said rotary valve, said rotary valve comprising a casing and a rotor having cooperating passages therein, the peripheral lengths of said passages adjacent the contact surfaces of the casing and rotor and the rate of rotation of the rotor determining the duration of the flow.

ANDREW J. DOTTERWEICH.